(12) United States Patent
Krasnow

(10) Patent No.: US 8,126,878 B2
(45) Date of Patent: Feb. 28, 2012

(54) ACADEMIC STUDY TOOL UTILIZING E-BOOK TECHNOLOGY

(76) Inventor: Arthur Z. Krasnow, Mequon, WI (US)

( * ) Notice: Subject to any disclaimer, the term of this patent is extended or adjusted under 35 U.S.C. 154(b) by 312 days.

(21) Appl. No.: 12/488,541

(22) Filed: Jun. 20, 2009

(65) Prior Publication Data

US 2010/0161653 A1    Jun. 24, 2010

Related U.S. Application Data

(60) Provisional application No. 61/075,245, filed on Jun. 24, 2008.

(51) Int. Cl.
*G06F 17/30* (2006.01)
*G06F 19/00* (2006.01)

(52) U.S. Cl. . 707/722; 707/803; 707/812; 707/E17.058; 715/731

(58) Field of Classification Search .................. None
See application file for complete search history.

(56) References Cited

U.S. PATENT DOCUMENTS

| | | | |
|---|---|---|---|
| 5,663,748 A | 9/1997 | Huffman | |
| 6,331,865 B1 | 12/2001 | Sachs | |
| 7,103,848 B2 | 9/2006 | Barsness | |
| 7,165,217 B1 | 1/2007 | Kondo | |
| 7,243,299 B1 | 7/2007 | Rubin | |
| 7,246,118 B2 | 7/2007 | Chastain | |
| 7,299,501 B2 | 11/2007 | Hendricks | |
| 2004/0107118 A1 | 6/2004 | Harnsberger | |
| 2004/0225968 A1* | 11/2004 | Look et al. | 715/778 |
| 2005/0005236 A1 | 1/2005 | Brown | |
| 2005/0034056 A1 | 2/2005 | Rubin | |

* cited by examiner

*Primary Examiner* — Jacob F Betit
*Assistant Examiner* — Miranda Huang
(74) *Attorney, Agent, or Firm* — Absolute Technology Law Group, LLC

(57) ABSTRACT

A software interface to increase the efficiency for reading, abstracting of information and locating material within an electron publication, pursuant to which author content and/or researcher content may be quickly searched, accessed and stored on an academic tool utilizing e-book technology. Topic mapping tools may be further used to enhance searching to link and cross reference terminology. For example, such tools are described in ISO/IEC 13250:2000 and more recently extended into XML format in XTM specifications. W3C® standards, such as DAML+OIL and topic map standards as well as functionally similar standards may also be utilized.

7 Claims, 6 Drawing Sheets

ACADEMIC STUDY TOOL UTILIZING E-BOOK TECHNOLOGY

CROSS-REFERENCE TO RELATED APPLICATIONS

This application claims priority to U.S. Provisional Application No. 61/075,245 filed on Jun. 24, 2008.

FIELD OF INVENTION

This invention relates generally to the field of portable devices for viewing books and written materials, and more specifically to an apparatus configured with software for assisting a reader to abstract and organize information as a learning tool and/or for professional use.

GLOSSARY

Figure 1:
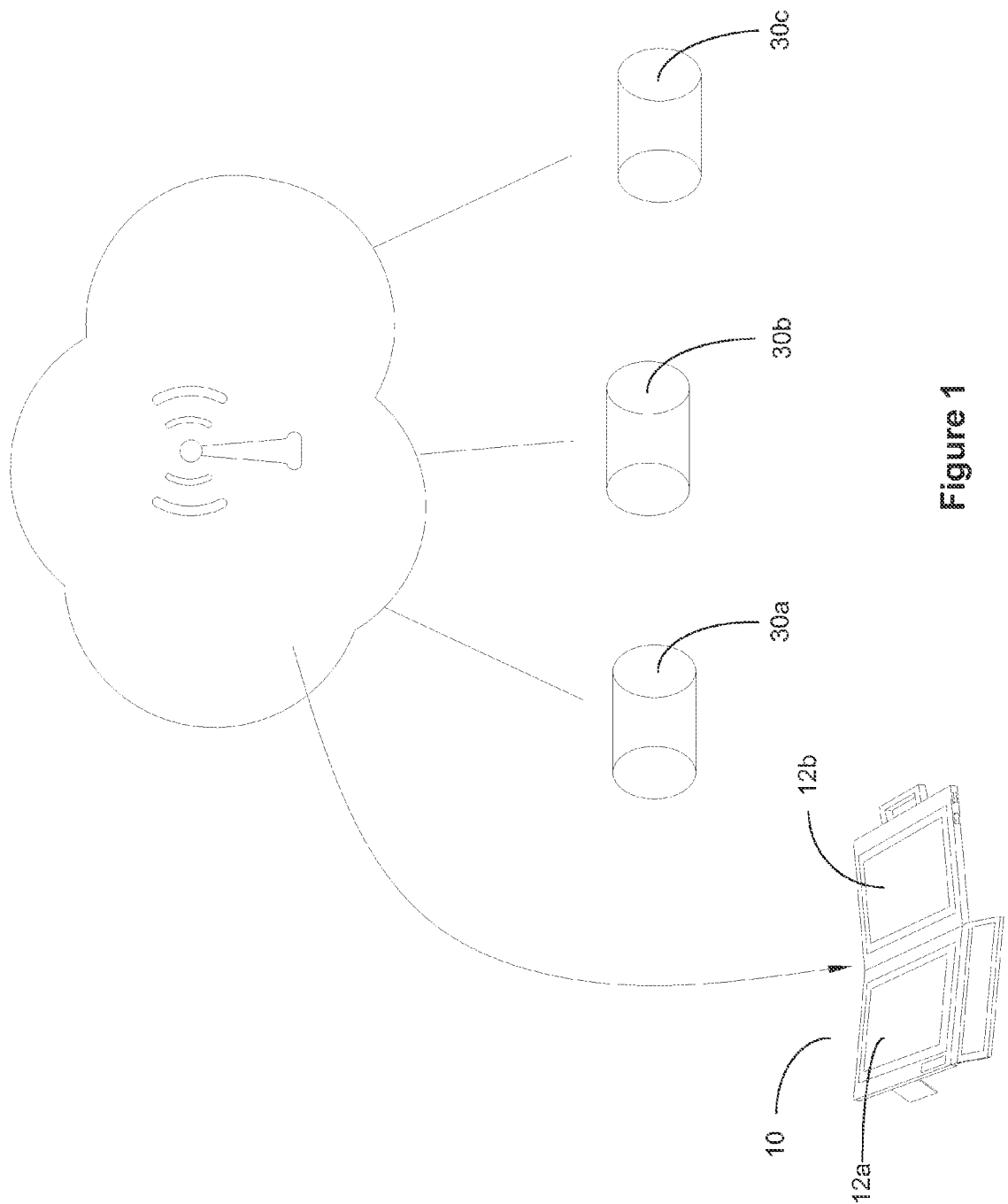
FIG. 1 illustrates an exemplary embodiment of a system which includes an academic study tool utilizing e-book technology.

As used herein, "abstract" or "abstraction" means any process by which a user copies, excerpts, highlights, formats or references desired portions of text (e.g., text containing important ideas) that are referenced in a larger work (e.g., including, but not limited to a sentence, paragraph, frame or other text or data unit).

As used herein, "abstracting interface" means an interface capable of displaying information selected by the user (e.g., text copied and pasted from text display interface) and allowing user to make outlines, highlight and underline text, add text and/or images, and manipulate the text in any other way.

As used herein, "text display interface" means an interface which is used to display text, such as the text of a book, article, paper, study or reference material, web-based content, presentation or text in any other format.

As used herein, "quasi unique abstracting interface" means an interface which a user creates.

As used herein, "case authoring tool ('CAT')" means a tool that allows an author to enter case descriptions, link to pertinent diagnostic names, case types, imaging studies and results, generic patient demographics, generic case history and publication history, and other information.

As used herein, "published text" means a book, article, paper, study or reference material, web-based content, presentation material, journal article, electronic or printed documents and media, electronic text in any format, ASCII and any other text and/or written material.

As used herein, "diagnostic authoring tool ('DAT')" means a tool that allows an author to enter text content compatible with digital database information, including diagnosis, key facts, images, findings, or any other useful information.

As used herein, "software component for reading" means a software component having reading capabilities.

As used herein, "software component for abstracting" means a software component for transferring text from one display interface to another display interface.

As used herein, "software component for editing" means a software component having one or more editing, searching, and annotation capabilities which may be utilized by a research user to create a personalized research document.

As used herein, "academic study tool" means a device adapted for the specialized needs of research users, having a hardware design and software functionality to facilitate such use.

As used herein, "e-book format" means any format used to create and/or publish human-readable content for an electronic reader. E-book format includes, but is not limited to a software component which allows for translation of the heterogeneous database language data objects and content to a format which can be viewed on an electronic reader. Examples of e-book formats include, but are not limited to plain text files, hypertext markup language, AZW format, open electronic book package format, TomeRaider, Arghos Diffusion, Flip Book, DAISY, FictionBook, TEI Lite, Plucker, CHM Format, PDF, PostScript, DjVu, Microsoft LIT, eReader, Desktop Author, DNL format, Newton eBook, APABI, iPod Notes, Libris, Mobipocket, IDPF/EPUB, Broadband eBooks, SSReader, and Multimedia Books. An e-book format includes any format which performs a function substantially equivalent to any of the foregoing e-book formats.

As used herein, "frame" means a segment displaying text, code or information.

As used herein, "heterogeneous database language" means a database which allows users (e.g., publishers, designers) to create their own customized tag elements, enabling the definition, transmission, validation, and interpretation of data between applicants.

As used herein, "hinged component" means a structural component that connects two or more components and allows one component to move relative to another (e.g., at an angle of rotation).

As used herein, "personalized research document" means a document, frame or interface created or modified by a research user using an editing software component having capabilities selectively accessed by the user.

As used herein, "research content" means the content which has been abstracted, organized, and otherwise marked or designated by the research user.

As used herein, "user interface" means a frame or interface that allows a research user to view a personalized research document.

A "relational database software component is a software" component capable of linking groups of text using common attributes found in the text (e.g., key words, concepts, text that has been labeled with the same concept name or identifier).

BACKGROUND

The average college student spends $900 per year. Because textbooks are frequently updated and new volumes are printed every few years, used textbooks are often unavailable for students. Professional texts and journals with limited readership may cost several hundred dollars. In addition, students are often unable to sell their used textbooks once new editions have been released.

Many professions and academic disciplines are based on cumulative research and hence the use of reference materials. For example, doctors and lawyers are required to access a large body of prior knowledge in making diagnoses, staying current and in rendering various types of opinions. Hence, professionals are often required to purchase each new edition even if the new edition contains only an insubstantial volume of new information.

If textbooks were published in a digital format, textbook production costs could be lessened by as much as 55.6%, reducing the average cost of a textbook to $23.54. In addition, publishing textbooks in a digital format would eliminate 100% of the physical resources of a traditional print version.

E-book devices allow readers to purchase books which have been formatted using one of the many different types of e-book formats for reading using an e-book device.

There are numerous e-books currently available; the most popular is Amazon's Kindle. Amazon released its first generation Kindle in November 2007. The Kindle sold out in five and a half hours and remained out of stock until late April 2008.

Amazon released its second generation Kindle, Kindle 2 in February 2009. Kindle 2 has a 6 inch display, 2 GB of internal memory (1.4 GB is user accessible) and a USB port. Kindle DX was released in May 2009. Kindle DX has a 9.7 inch display and is the first Kindle model which allows the reader to switch between portrait and landscape orientations. Kindle DX can also support PDF files and has built-in stereo speakers. Both Kindle 2 and Kindle DX allow the reader to search the text although the devices' searching capabilities are limited (e.g., can only search for the root of the word, but not an ending). It is estimated that Amazon will sell $750 million in Kindles by 2010, an estimated 3% of Amazon's total revenue.

There are currently a number of e-book formats for viewing electronic books, each having various capabilities and features. One of the most popular e-book formats is HTML which is the markup language used for most web pages. HTML adds especially marked meta elements to otherwise plain text encoded using characters sets such as ASCII or UTF-8. HTML generator applications are usually easy to use and often require less intricate knowledge of the format details involved. On the other hand, HTML is not particularly efficient for storing information and requires more storage space than many other formats. In addition, HTML does not describe pages and has no facility to store multiple images in a single file. When e-books are HTML format, each file usually contains only one chapter.

Another popular e-book format is the AZW format, Amazon's proprietary format. The AZW format is based on the Mobipocket standard, but uses a slightly different serial number scheme (e.g., it uses an asterisk instead of a dollar sign) and its own DRM formatting. The AZW format does not fully support PDFs.

Mobipocket is an e-book format based on the Open eBook standard using XHTML. The Mobipocket Reader allows readers to add blank pages in any part of the book and add free-hand drawings. The reader can also include annotations, such as highlights, bookmarks, corrections, notes and drawings, which can then be applied, organized, and recalled from a single location. The Mobipocket Reader also has electronic bookmarks and a built-in dictionary.

Another e-book format is the eReader format, a program for viewing Palm Digital Media electronic books. The eReader shows text one page at a time, supports embedded hyperlinks, images and features such as bookmarks and footnotes enabling the user to mark any page with a bookmark and any part of the text with a footnote-like commentary. Footnotes can later be exported as a Memo document. In addition, eReader also supports an integrated reference dictionary allowing any word in the text to be highlighted and looked up in the dictionary instantly.

Currently none of these e-book formats has a range of capabilities for academic use. Moreover, electronic reader devices are not designed to facilitate academic learning and professional development.

In addition, electronic reader devices are not designed to facilitate visual learning, which is an important component of academic learning. Visual learning is a teaching method and learning component in which ideas, concepts, data and other information are associated with images and techniques and formats. Visual learning is one of the three basic types of learning styles, in addition to kinesthetic learning and auditory learning. Reinforcing text materials through interactive tools and allowing a reader to both actively manipulate text information and visually organize it can greatly increase learning and comprehension for all age groups, academic levels and professional users.

In addition to the foregoing languages specifically for e-books, extensible markup language ("XML") provides a mature and standardized interface for electronic publishing. XML has become a widely utilized medium for the exchange of data on the WWW. XML is an example of a heterogeneous database language. Vendors (such as Oracle®, IBM®, and Microsoft®) have fast-tracked XML implementation modules for their traditional databases and have (or are) designing XML native databases.

A heterogeneous database language such as XML theoretically allows publishers and designers to create their own customized tag elements, enabling the definition, transmission, validation, and interpretation of data between applications.

In relation to the publishing of reference materials, such as medical texts or treatises, XML has been utilized as the supporting heterogeneous database language to a variety of sources, including: UMLS® Metathesaurus® (the "Metathesaurus®"), SPECIALIST Lexicon, and UMLS® Semantic Network. The Metathesaurus® currently contains content from over 60 biomedical vocabularies and classifications. It preserves the names, meanings, hierarchical contexts, attributes, and an inter-term relationships present in its source vocabularies, adds certain basic information to each concept, and establishes new relationships between terms from different source vocabularies. The Metathesaurus® supplies information that computer programs can use to interpret user inquiries, interact with users to refine their questions, identify which databases contain information relevant to particular inquiries, and convert the users' terms into the vocabulary used by relevant information sources. The Metathesaurus® is intended primarily for use by system developers, but can also be a useful reference tool for database builders, librarians, and other information professionals.

UMLS® SPECIALIST Lexicon (the "SPECIALIST") for recognizing language provides a further example of a heterogeneous database language used to assist researcher users in the biomedical field. SPECIALIST extracts syntactic, morphological, and orthographic information. It includes a file of known derivational variants, a file of closely related terms that mean the same thing but may have a different syntactic category, a file of spelling alternations, and a file of neoclassical combining forms with their meanings.

Similarly UMLS® Semantic Network (the "Semantic Network") provides 134 semantic subtypes to provide consistent categorization of all concepts within the Metathesaurus® with 54 links between semantic subtypes. While all information about specific concepts is found in the Metathesaurus®, the Semantic Network provides information about the basic semantic types that are assigned to these concepts, and it defines the relationships that hold between the semantic types. Thus, the Semantic Network serves as an authority for the semantic types that are assigned to concepts in the Metathesaurus®. It defines these types, both with textual descriptions and by means of the information inherent in its hierarchies.

System developers can use these UMLS® products free of charge after applying for a UMLS® license. Applications of UMLS® can be found in systems focused on patient data, digital libraries, Web and bibliographic retrieval, natural language processing, and decision support.

Another product which is free of charge is MeSH, yet another known lexical product, provides a simple layer in that it consists of a thesaurus with a set of terms or subject headings that are arranged in both an alphabetic and a hierarchical structure. It contains more than 19,000 main headings as well as 103,500 headings called Supplementary Concept Records within a separate chemical thesaurus. There are also thousands of cross-references that assist in finding the most appropriate MeSH heading (e.g., Vitamin C see Ascorbic Acid). MeSH is free to users and an electronic form can easily be downloaded.

The prior art also includes software enabling research users to express relationships between existing resources (i.e., content) such as the Resource Description Framework ("RDF") and the RDF Schema ("RDFS") as forms for expressing relationships and semantic metadata. RDF is a general framework used for describing metadata and provides interoperability between applications that exchange machine-understandable information. RDFS is a specification that describes how to use RDF to describe RDF vocabularies and defines a basic vocabulary for this purpose, as well as conventions that can be used by semantic applications to support a more sophisticated RDF vocabulary description. A further development has been the DARPA Agent Markup Language ("DAML") and the Ontology Inference Layer ("OIL") specifications, which are currently being combined to produce DAML+OIL. DAML+OIL is a semantic markup language for Web resources that builds upon the earlier W3C® standards of RDF and RDFS, extending these languages with richer modeling primitives allowing more complex objects and operations to be constructed.

It is desirable to have an electronic reader adapted for the specialized needs of the research users, having a hardware design and software functionality to facilitate such use which uses a form of heterogeneous database language and open source or freely available prior art software (such as .html, Metathesaurus®, SPECIALIST Lexicon, UMLS® Semantic Network, MeSH, RDF, and RDFS) to standardize the interface necessary for implementing such features.

It is desirable to have an academic study tool utilizing e-book technology which can be used as a learning tool for children by providing tools to teach them to abstract information, and which provides visual reinforcement of concepts as well as an interactive experience when reading tex.

It is further desirable to have an academic study tool utilizing e-book technology which assists professionals in organizing and abstracting information; creating outlines, notes and study materials; and in visualizing the interaction between key concepts.

It is further desirable to have an academic study tool utilizing e-book technology which reduces the costs of books and updating them.

It is further desirable to have an academic study tool utilizing e-book technology which conserves the physical resources consumed for printed books.

SUMMARY OF THE INVENTION

The present invention is an academic study tool utilizing e-book technology including e-book software technology and formats known in the art to create an interactive and visual learning tool.

SUMMARY OF VARIOUS EMBODIMENTS OF THE INVENTION

It is understood that the above-described arrangements are only illustrative of the application of the basic principles of the present invention. Numerous modifications and alternative arrangements may be devised by those skilled in the art without departing from the spirit and scope of the present invention. The appended claims are intended to cover such modifications and arrangements. For example, it is noted that there is no requirement for the basic principal of the illustrated invention to be strictly related to medical technology or for any particular area, level or field of academic use.

For the purpose of promoting an understanding of the present invention, references are made in the text to exemplary embodiments of an academic study tool utilizing e-book technology, only some of which are described herein. It should be understood that no limitations on the scope of the invention are intended by describing these exemplary embodiments. One of ordinary skill in the art will readily appreciate that alternate but functionally equivalent components, formats and technology may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

FIG. 1 shows a system for using an academic study tool utilizing e-book technology. Published text is made available for purchase in an electronic format from a content database. In one embodiment, published text is an academic textbook, but may be any other type of professional resource. In one embodiment, content database is an electronic purchasing database (e.g., eBooks.com, Amazon.com).

Academic study tool utilizing e-book technology 10 allows the user to purchase and download document content directly from a content database 30a, 30b, 30c or to transfer document content to academic study tool utilizing e-book technology 10 from another source using a flash drive or another UBS compatible device.

Academic study tool utilizing e-book technology 10 has two interacting screens 12a, 2b. In the embodiment shown, 12a is a text display interface and 12b is an abstracting interface. In the embodiment shown, abstracting interface 12b can be used to outline, highlight, underline and organize text in any other manner, allowing the user to create their own unique interface displaying concepts and material. In the embodiment shown, text display interface and abstracting interface are viewed simultaneously and are controlled independently.

Academic study tool utilizing e-book technology 10 is capable of storing multiple books in a single device. The user can also update any text stored in academic study tool utilizing e-book technology 10 simply by downloading (or transferring from an external source) any updates when a new edition becomes available from a vendor.

In various embodiments, academic study tool utilizing e-book technology 10 may utilize additions made by a content author who can use case authoring tool ("CAT") or diagnostic authoring tool ("DAT") to add additional information (i.e., case and diagnostic information) to published text, i.e., author content.

A user can then download published text and/or author content for electronic viewing. In an exemplary embodiment, research user downloads published text and/or author content for viewing on academic study tool utilizing e-book technology 10. A formatting software component translates published text and author content into an e-book format so that it can be viewed on academic study tool utilizing e-book technology 10.

In another embodiment, a user can download presentations (e.g., Microsoft PowerPoint). Interacting screens 12a, 12b of academic study tool utilizing e-book technology 10 allows a user to view one or more slides simultaneously on one or both interacting screens 12a, 12b. In the alternative, a user may view slides on interacting screen 12a while using interacting screen 12b to take notes.

Figure 2:
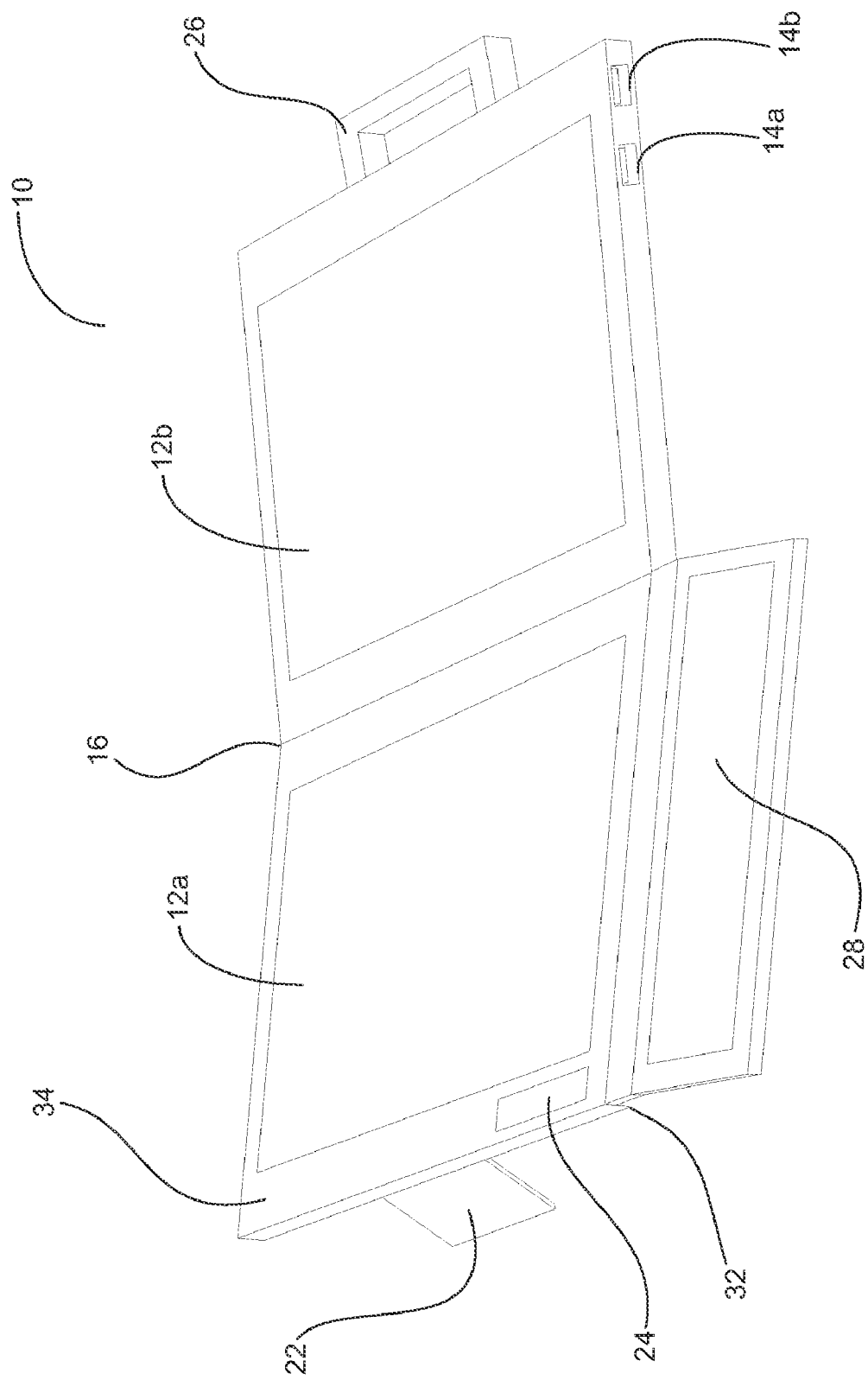
FIG. 2 illustrates an exemplary academic study tool utilizing e-book technology.

FIG. 2 shows an exemplary embodiment of an academic study tool utilizing e-book technology 10 further illustrating both screens. In the embodiment shown, interacting screen 12a is a text display interface showing text from one or more sources while interacting screen 12b is an abstracting interface showing highlighted, underlined text in an outline format.

In the embodiment shown, academic study tool utilizing e-book technology 10 is a split screen reader having two interacting screens 12a, 12b. Interacting screens 12a, 12b are connected by hinge component 16 which allows interacting screens 12a, 12b to be folded inward when not in use. In other embodiments, academic tool utilizing e-book technology 10 may contain a pivot component in place of, or in addition to, hinge component 16. A pivot component allows the orientation of interacting screens 12a, 12b to be changed (e.g., from portrait to landscape). In other embodiments, interacting screens 12a, 12b can also be changed from portrait to landscape simply by rotating academic study tool utilizing e-book technology 10.

Also visible in FIG. 2 are optional support stand component 22 to further facilitate academic and reference viewing, optional speaker/audio input device 24, optional handle component 26, and optional keyboard 28 (data entry component). In the embodiment shown, speaker/audio input device 24 is located near the lower, left corner of interacting screen 12a. In other embodiments, speaker/audio input device 24 may be located elsewhere on academic study tool utilizing e-book technology 10.

In the embodiment shown, keyboard 28 is connected to the bottom of interacting screen 12a and contains a hinge component 32 which allows keyboard 28 to be folded underneath interacting screen 12a when not in use. In other embodiments, keyboard 28 is connected to the bottom of interacting screen 12b, centered between interacting screens 12a, 12b, or in any other configuration. Keyboard 28 may be fixedly attached to one or both interacting screens or may be removable. In other embodiments, academic study tool utilizing e-book technology 10 contains additional data entry components, such as a touchpad.

In the embodiment shown, academic study tool utilizing e-book technology 10 further includes outer casing 34. In the embodiment shown, outer casing 34 is padded providing comfortable to a user and additional protection to academic study tool utilizing e-book technology 10. Also shown are two USB ports 14a, 14b, which allow other devices to be connected to academic study tool utilizing e-book technology 10 (e.g., flash drive, printer). In other embodiments, there are more or fewer than two USB ports. Academic study tool utilizing e-book technology 10 further includes an editing software component and a storage device for storing published text and a user's research content and/or information on a user's quasi unique abstracting interface.

In the embodiment shown, an editing software component allows a user to create (e.g., through abstraction, annotation) and edit research content. In the embodiment shown, the editing software component further allows research user to search published text and/or research content stored in the storage device.

In various embodiments, an editing software component allows the user to cut and paste, touch and drag text from one location on an interacting screen to another location or from one interacting screen to another interacting screen.

In various embodiments, academic study tool utilizing e-book technology has outlining capabilities which make formatting of outlines easier and encourage the use of outlines in research, studying, organization and learning.

Various additional embodiments of the academic study tool utilizing e-book technology 10 shown in FIG. 2 may include use of frames 75 where each interacting screen 12a, 12b is broken down into several segments each displaying different types of information; hyperlinks in one frame will open up different information pages in other frames, either on the same interacting screen or the other interacting screen depending on the type of information.

Figure 3:
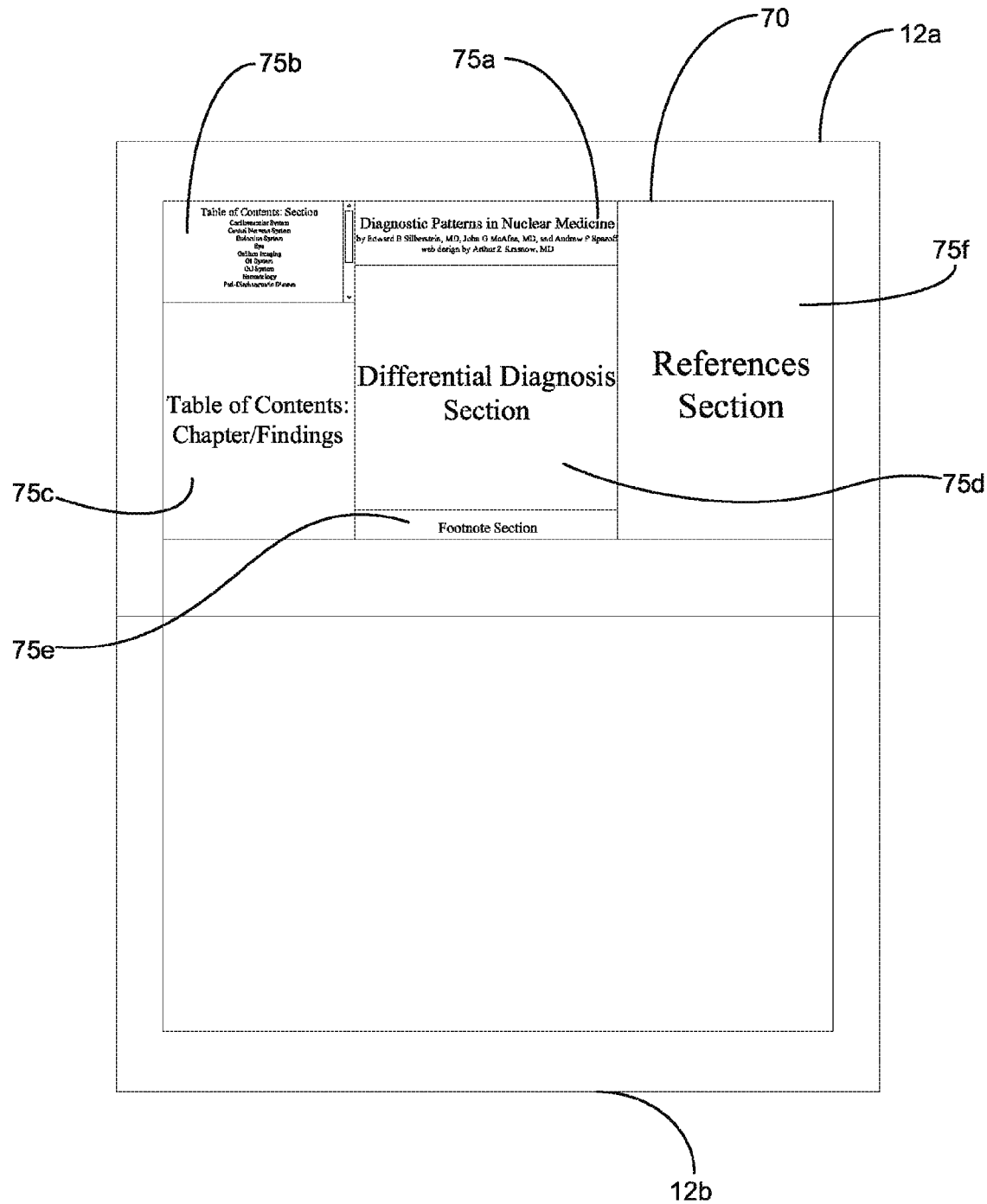
FIG. 3 illustrates an exemplary interface for an academic study tool utilizing e-book technology.

FIG. 3 illustrates an exemplary embodiment of an interface of academic study tool utilizing e-book technology 10 which is used as a professional reference tool for academic users and researchers who must reference and organize large amounts of professional materials and who want to link such materials (e.g., professors, lawyers, scientists). In the embodiment shown, one representation of a text display interface 70 is visible on interacting screen 12a. Text display interface 70 utilizes one or more frames 75 which a user can manipulate for selective viewing. In the embodiment shown, the text display interface 70 has six frames 75a, 75b, 75c, 75d, 75e, 75f which allow a user to choose the published content he or she wants to view. For example, frame 75a shows the title and authors of the selected published text. Frame 75b shows a table of contents of the sections included in the selected published text; frame 75c shows a table of contents of the chapters within the selected section. When the user selects a section listed in frame 75b, the chapters within that section are depicted in frame 75c. The user then selects a chapter or subpart from frame 75c and the text of the chapter or subpart will appear in frame 75d. The footnotes from the chapter or subpart appearing in frame 75d are visible in frame 75e; references are visible in frame 75f. In other embodiments, text display interface 70 displays more or fewer than six frames and the frames may display published text other than that of the example provided.

In various embodiments, the content displayed in frames 75 may or may not be capable of being modified. For example, in various embodiments, a user can comment, abstract, take notes, create outlines, cross-reference, access or incorporate online information, create an indexed database of multi-source abstracts, read newspapers, write papers and other materials, use in meetings or for lectures, view personal documents, complete non-reading homework assignments, and take tests.

Figure 4:
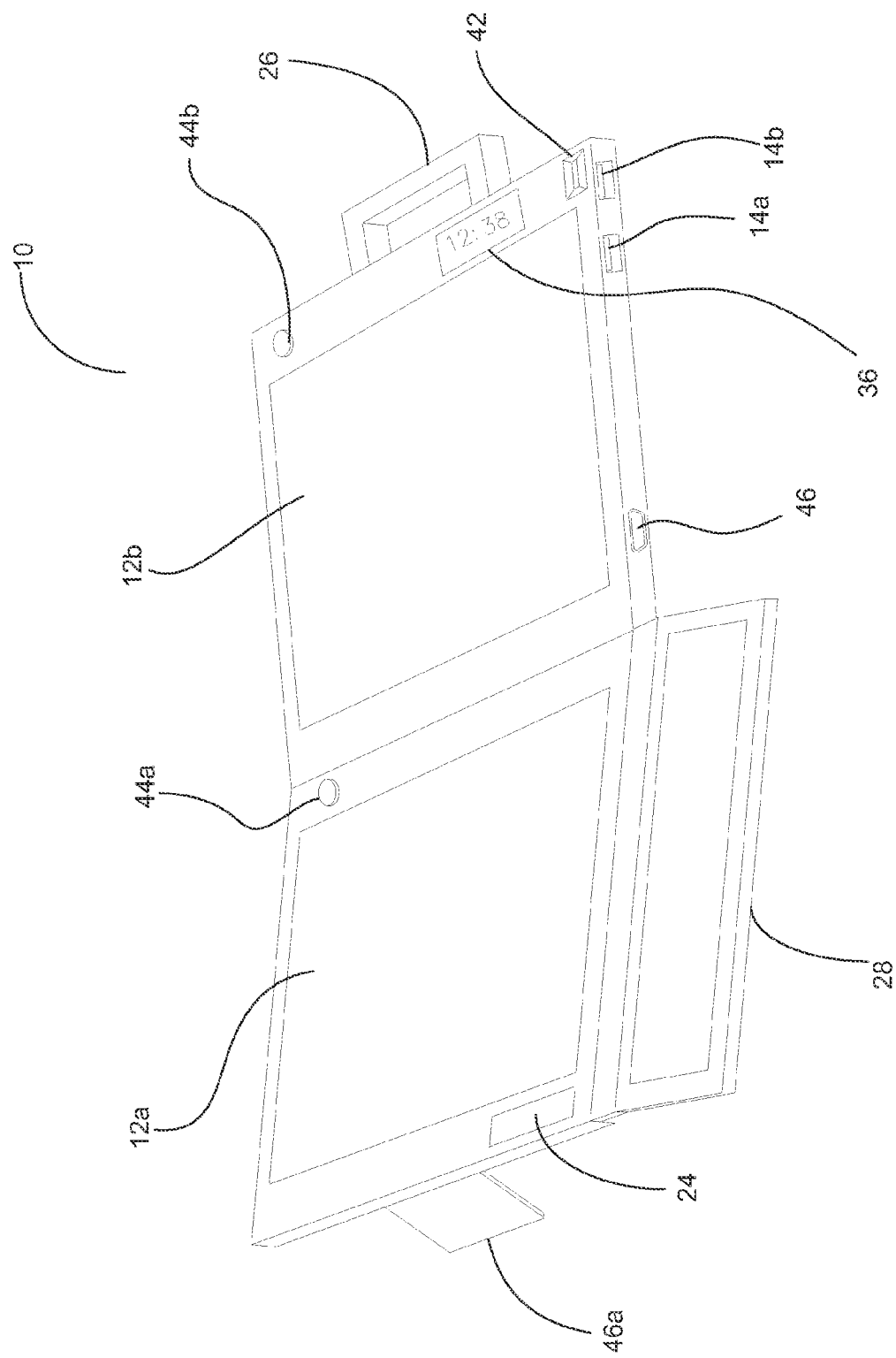
FIG. 4 illustrates an exemplary academic study tool utilizing e-book technology with optional components.

FIG. 4 illustrates an additional exemplary embodiment of academic study tool utilizing e-book technology 10 containing optional components to facilitate academic and research use. In the embodiment shown, academic study tool utilizing e-book technology 10 is a split screen reader having two interacting screens 12a, 12b, optional clock 36 which also functions as a timer, and optional pivot component which allows a user to change the orientation of interacting screens 12a, 12b (e.g., from portrait to landscape).

In the embodiment shown in FIG. 4, academic study tool utilizing e-book technology 10 further includes optional second storage device 38 (not shown), optional security component 42, optional focus controls 44a, 44b, and optional video in/out jack 46. In the embodiment shown, security component 42 is a finger reader. In other embodiments, security component 42 may be any component or device which prevents others from accessing materials without permission, preventing transfer of copyrighted materials (e.g., published text) from one electronic reader to another electronic reader or another device. In the embodiment shown, there are two focus controls, one for each interacting screen 12a, 12b.

Figure 5A:
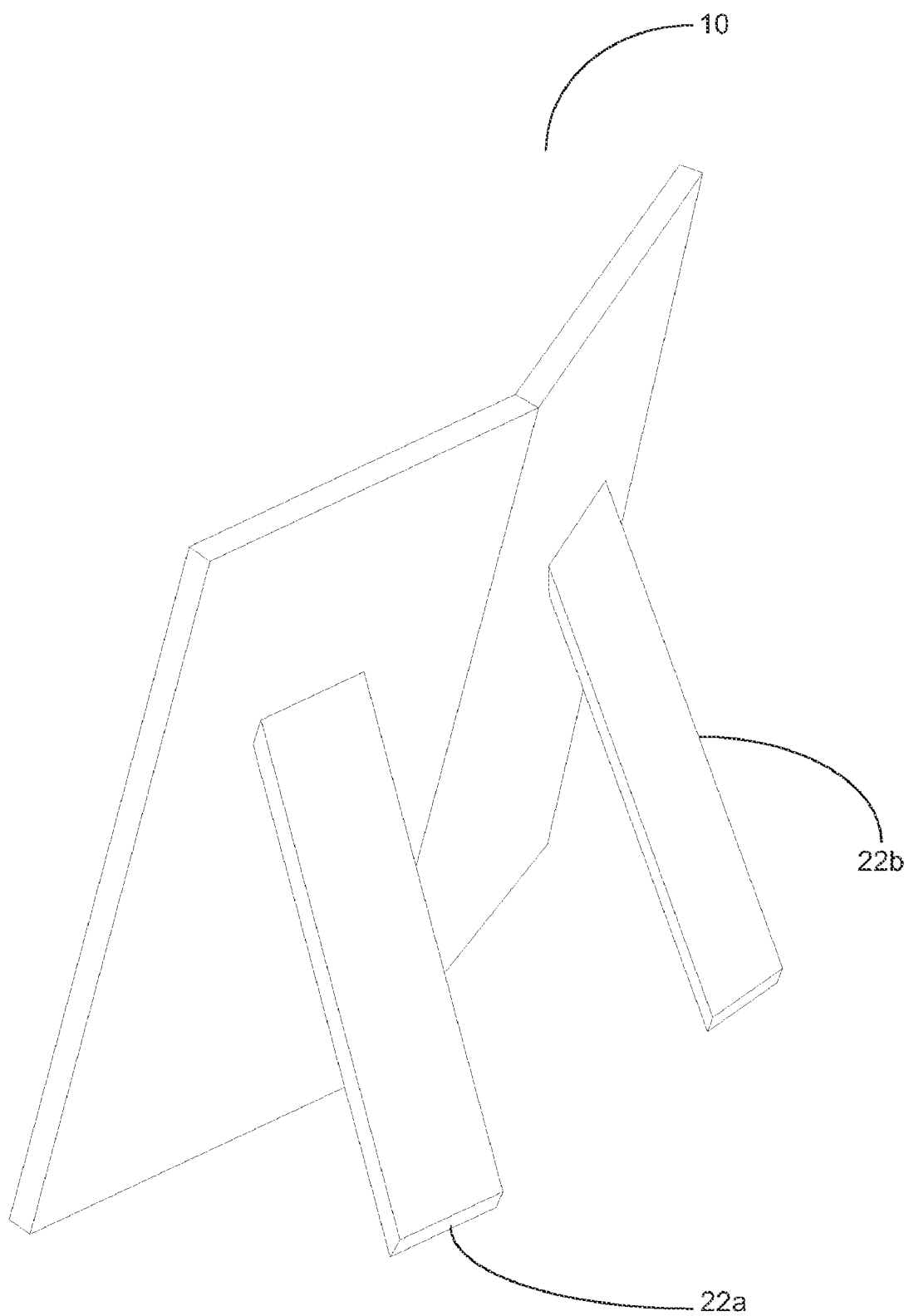
FIG. 5a illustrates an exemplary configuration of an academic study tool utilizing e-book technology in an upright position.

FIG. 5a shows an exemplary embodiment of academic study tool utilizing e-book technology 10 in an upright position to facilitate visual learning. In the embodiment shown, academic study tool utilizing e-book technology 10 is supported on support stand components 22a, 22b.

Figure 5B:
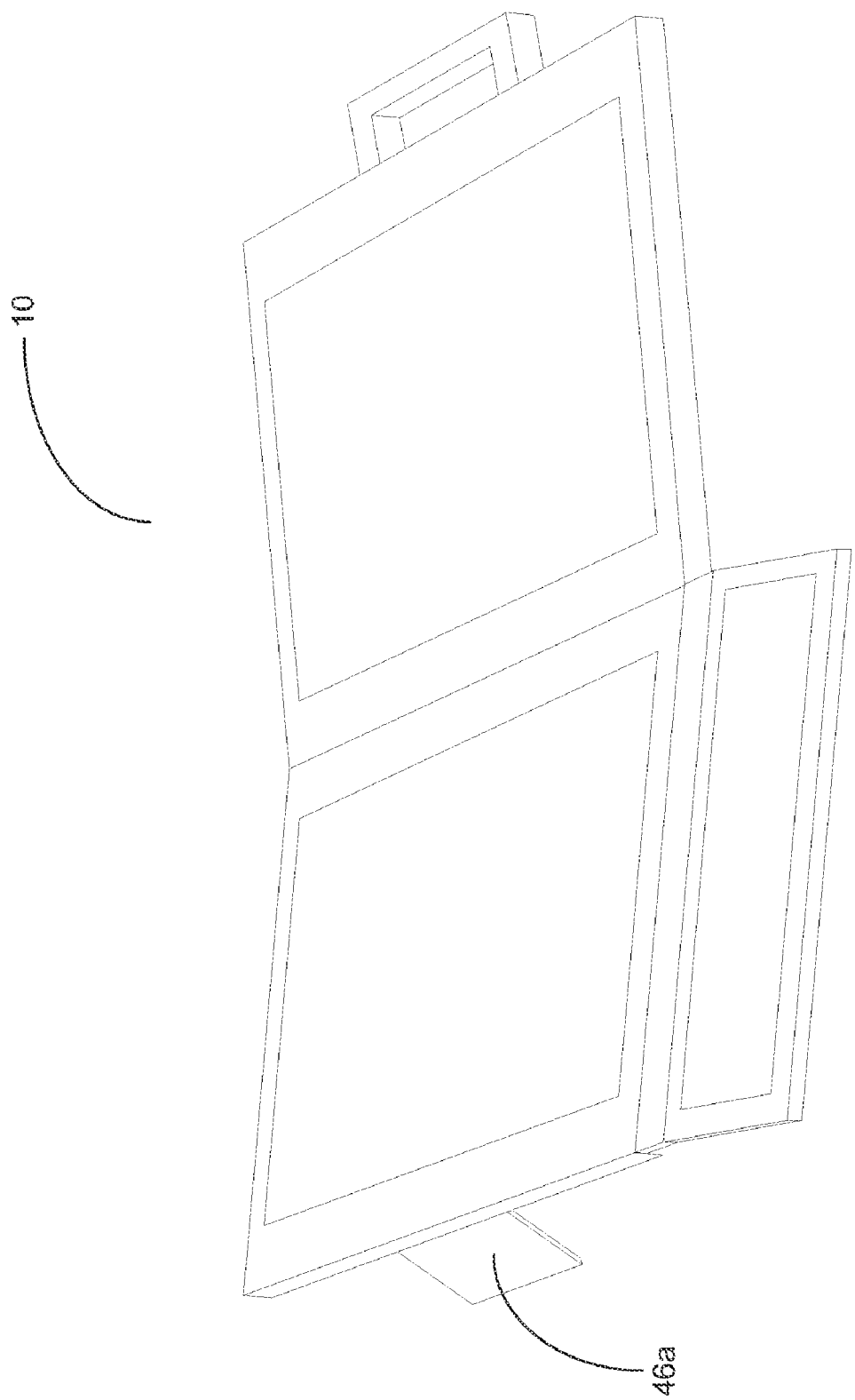
FIG. 5b illustrates an exemplary configuration of an academic study tool utilizing e-book technology in an elevated position.

FIG. 5b shows an exemplary embodiment of academic study tool utilizing e-book technology 10 in an elevated position to facilitate visual learning. In the embodiment shown, academic study tool utilizing e-book technology 10 is supported on side extensions 46a, 46b (only 46a is visible).

What is claimed is:

1. An apparatus for transforming multi-source medical research documents comprised of:
    a housing support structure which inter-operably connects an alpha numeric data entry component support and, at least one data storage component;
    a network connection component which enables the device to connect to the internet to download the medical research documents from multiple sources;
    a first screen and a second screen pivotally connected and symmetrical;
    wherein said first screen displays a first user interface and said second screen displays a second user interface with the first user interface and the second user interface each displaying separate data;
    a first processor configured to perform a first algorithmic search for said multi-source medical research documents and storing said multi-source medical research documents in a plurality of medical research data files stored on said at least one data storage component;
    a first user interface configured to display a search result including a plurality of medical research documents, configured to create customized abstractions by adding tags, annotations and outlines to user identified text components, and configured to further search within the first search result to perform a second algorithmic search;
    wherein said first processor further configured to create text abstraction functions by linking groups of text from the medical research documents, assigning a same identifier to commonly tagged attributes in the text components of the multi-source medical research documents, the text components comprising keywords, concepts and phrases, and storing the result into a relational database stored in one of the storage devices;
    the plurality of multi-source medical research data files which contain data structures and data values are used by a second processor to create and display a user defined hierarchal data structure and personalized research document file based on the information stored in the relational database;
    the second processor configured to create said user defined hierarchal data structure to display said plurality of transformed medical research documents and create a personalized research document file which includes hierarchal links systematically connecting multi-source medical research documents;
    the second user interface configured to display said personal research document;
    wherein said second processor is further configured to transform said multi-source medical research documents displayed on said first user interface to create a user defined interface on said second display, which reflects a hierarchal linking structure created by said user; and
    wherein said second processor is further configured to coordinate the display of said plurality of documents on the first display by allowing user to identify and select the corresponding abstract data from the hierarchical linking structure displayed on the second display.

2. The apparatus for transforming multi-source medical research documents of claim 1 wherein said software component for reading allows viewing of assignments.

3. The apparatus for transforming multi-source medical research documents of claim 1 wherein said software component for abstraction allows completion and submission of assignments on said at least one abstracting interface.

4. The apparatus for transforming multi-source medical research documents further includes at least one component selected from a group consisting of memory storage device and an internet access device.

5. The apparatus for transforming multi-source medical research documents of claim 1 which further includes at least one software component for editing capable of performing a function selected from a group consisting of highlighting, underlining, linking, annotating, querying results from a relational database, displaying results from a relational database.

6. The apparatus for transforming multi-source medical research documents of claim 1 wherein said software component for editing allows the user to cut and paste and touch and drag text.

7. The apparatus of claim 1 wherein said medical research document for reading is selected from the group consisting of plain text files, hypertext markup language, AZW format, open electronic book package format, TomeRaider, Arghos Diffusion, Flip Book, DAISY, FictionBook, TEI Lite, Plucker, CHM Format, PDF, PostScript, DjVu, Microsoft LIT, eReader, Desktop Author, DNL format, Newton eBook, APABI, iPod Notes, Libris, Mobipocket, IDPF/EPUB, Broadband eBooks, SSReader, and Multimedia Books, ASCII, Adobe, Microsoft Word and combinations thereof.

* * * * *